United States Patent
Park et al.

(10) Patent No.: US 8,988,545 B2
(45) Date of Patent: Mar. 24, 2015

(54) DIGITAL PHOTOGRAPHING APPARATUS AND METHOD OF CONTROLLING THE SAME

(75) Inventors: Sung-ha Park, Seoul (KR); Sung-bin Hong, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 167 days.

(21) Appl. No.: 13/238,407

(22) Filed: Sep. 21, 2011

(65) Prior Publication Data
US 2012/0081560 A1    Apr. 5, 2012

(30) Foreign Application Priority Data
Oct. 1, 2010    (KR) .................. 10-2010-0095972

(51) Int. Cl.
*H04N 5/228*     (2006.01)
*H04N 5/232*     (2006.01)
*H04N 5/225*     (2006.01)

(52) U.S. Cl.
CPC ....... *H04N 5/23229* (2013.01); *H04N 5/23219* (2013.01); *H04N 5/23277* (2013.01)
USPC ............ 348/222.1; 348/345; 348/220.1

(58) Field of Classification Search
USPC ............ 348/207.99, 208.99, 345, 346, 349, 348/208.4, 208.12, 222.1, 241, 221.1, 348/220.1, 218.1; 382/116–118
See application file for complete search history.

(56) References Cited

U.S. PATENT DOCUMENTS

| | | | |
|---|---|---|---|
| 7,826,092 B2* | 11/2010 | Ejima et al. | 358/2.1 |
| 8,253,848 B2* | 8/2012 | Terashima | 348/353 |
| 8,330,831 B2* | 12/2012 | Steinberg et al. | 348/231.3 |
| 2003/0117505 A1* | 6/2003 | Sasaki et al. | 348/231.99 |
| 2006/0256396 A1* | 11/2006 | Ejima et al. | 358/448 |
| 2007/0201724 A1 | 8/2007 | Steinberg et al. | |
| 2008/0317357 A1* | 12/2008 | Steinberg et al. | 382/209 |
| 2009/0244311 A1* | 10/2009 | Eom et al. | 348/222.1 |
| 2010/0194912 A1* | 8/2010 | Terashima | 348/222.1 |
| 2011/0096179 A1* | 4/2011 | Border et al. | 348/208.4 |

FOREIGN PATENT DOCUMENTS

KR    1020090100831 A    9/2009

* cited by examiner

*Primary Examiner* — Ahmed A Berhan
(74) *Attorney, Agent, or Firm* — Drinker Biddle & Reath LLP

(57) ABSTRACT

A digital photographing apparatus and a method of controlling the same are provided. The digital photographing apparatus obtains a first image from an input image according to a first shutter input signal, obtains a second image from the input image according to a second shutter input signal, and corrects the second image based on the first image.

24 Claims, 10 Drawing Sheets

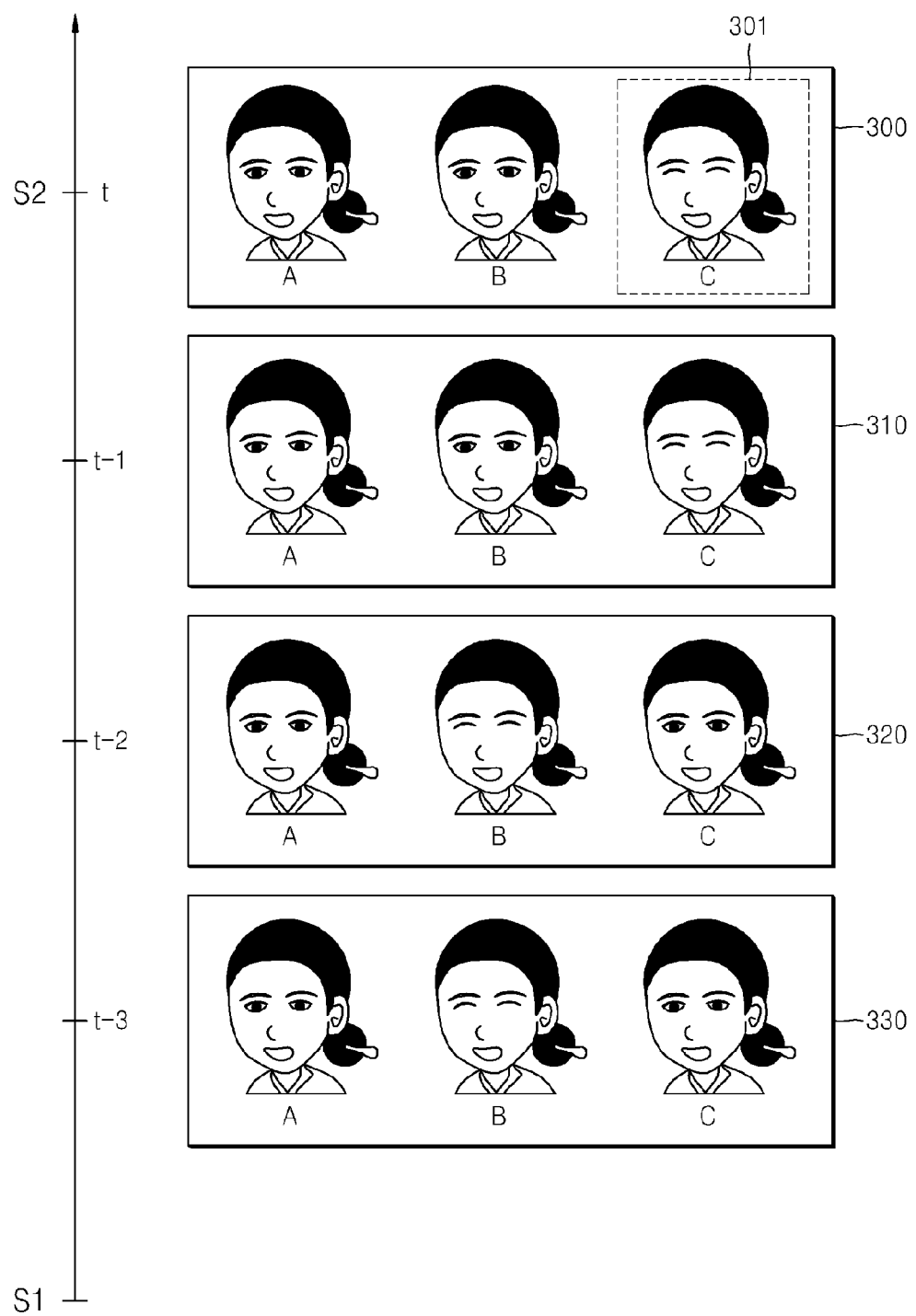

DIGITAL PHOTOGRAPHING APPARATUS AND METHOD OF CONTROLLING THE SAME

CROSS-REFERENCE TO RELATED PATENT APPLICATION

This application claims the benefit of Korean Patent Application No. 10-2010-0095972, filed on Oct. 1, 2010, in the Korean Intellectual Property Office, the disclosure of which is incorporated herein in its entirety by reference.

BACKGROUND

The invention relates to a digital photographing apparatus and a method of controlling the digital photographing apparatus.

Generally, a digital photographing apparatus stores still image data, obtained by a photographing operation in a photographing mode, in a storage medium and displays an image of the still image data stored in the storage medium on a display unit. Also in the photographing mode, a still image obtained by the photographing operation may be displayed on the display unit.

A photographer pushes a shutter button of the digital photographing apparatus at a most desirable time. However, contrary to the photographer's intention, a subject's smiling face disappears before photographing at a photographing time, or a person moves at the photographing time and thus, a photographed image is blurred. In these cases, the photographed image may not be satisfactory to the photographer. For example, when a still image including a face is obtained by using the digital photographing apparatus, a user usually intends a face with eyes open. However, contrary to the user's intention, the eyes of the face included in the still image are often closed, and in this case, the user has to newly obtain another still image including a face with eyes open.

SUMMARY

Various embodiments of the invention provide a digital photographing apparatus capable of correcting a facial expression change, for example, a blink portion of a subject, or a shake/movement of the photographer/subject in a main captured image based on one or more pre-captured images obtained after a time S1.

According to an embodiment of the invention, there is provided a method of controlling a digital photographing apparatus. The method includes obtaining a first image from an input image according to a first shutter input signal, obtaining a second image from the input image according to a second shutter input signal, and correcting the second image based on the first image.

The first shutter input signal may be a half-shutter signal and the second shutter input signal may be a full-shutter signal.

The method may further include detecting a face from the second image, detecting an eye blink from the detected face, and synthesizing an eye portion in the first image onto the second image if the eye blink is detected.

The method may further include determining whether there is a shake in the second image, wherein the correcting of the second image includes, if there is a shake in the second image, replacing the second image by the first image.

The obtaining of the first image may include performing auto focusing on the input image according to the first shutter input signal and obtaining N first images between a timing of completion of the AF and when the second shutter input signal is received, in which N is a positive integer greater than 1.

The obtaining of the N first images may include detecting a face from each of the N first images, excluding a first image including a face having an eye blink from the N first images, and selecting one of the remaining first images having no eye blink. xxx The correcting of the second image may include cropping an eye portion of the selected first image and an eye portion of the second image and synthesizing the cropped eye portion of the first image onto the eye portion of the second image.

The selecting of the first image may include selecting a first image obtained at a timing close to the timing of the second shutter input signal.

The selecting of the first image may include selecting a first image including a face having the largest eyes from among the first images including faces having no eye blink.

The selecting of the first image may include comparing a size of the eyes of a face of each of the first images including faces having no eye blink with a size of the eyes of a face of the second image and selecting a first image including a face which has eyes most similar in size to those of the second image.

The selecting of the first image may include comparing a position of the eyes of a face of each of the first images including faces having no eye blink with a position of the eyes of a face of the second image and selecting a first image including a face which has eyes in the most similar position to that of the second image.

The obtaining of the N first images may include: determining whether there is a shake in the N first images; excluding a first image with a shake from the N first images; and selecting one of the remaining first images having no shake.

The selecting of the first image may include selecting the first image based on an image with the smallest degree of a shake, an image in which a coordinate in a particular region of the second image coincides with a coordinate of the first image, and an image captured at a time close to when the second shutter input signal is received.

The method may further include storing the N first images. When a $(N+1)^{th}$ first image is to be stored, one of the stored first images may be removed in an order they are stored.

According to another embodiment of the invention, there is provided a method of controlling a digital photographing apparatus. The method includes performing auto focusing on an input image according to a half-shutter input signal, obtaining a plurality of first images by capturing the input image at predetermined time intervals after completion of the auto focusing, and storing the obtained plurality of first images, obtaining a second image by capturing the input image according to a full-shutter input signal, detecting an eye blink from the second image and if the eye blink is detected, selecting a first image including no eye blink from among the plurality of first images, and cropping an eye portion of the selected first image and an eye portion of the second image and synthesizing the cropped eye portion of the first image onto the second image.

The method may further include removing the stored plurality of first images if the eye blink is not detected from the second image.

The selecting of the first image may include selecting the first image based on at least one of whether the first image is captured at a timing close to a timing of the full-shutter input signal, whether the first image has the largest eyes from among the plurality of first images, whether the first image has eyes similar in size to those of the second image, and whether the first image has eyes in a similar position to that of the second image.

According to another embodiment of the invention, there is provided a digital photographing apparatus including a digital signal processor (DSP) that obtains a first image from an input image according to a first shutter input signal, obtains a second image from the input image according to a second shutter input signal, and corrects the second image based on the first image.

The first shutter input signal may be a half-shutter signal and the second shutter input signal may be a full-shutter signal.

The DSP may include a face detecting unit detecting a face from the second image, a blink detecting unit that detects an eye blink from the detected face, and a blink correcting unit that synthesizes an eye portion in the first image onto the second image if the eye blink is detected.

The DSP may include: a shake determining unit that determines whether there is a shake in the second image and if there is a shake in the second image, determines whether there is a shake in at least one first image; and a shake correcting unit, if there is a shake in the second image, that selects a first image having no shake and replacing the second image by the selected first image.

The DSP may perform auto focusing on the input image according to the first shutter input signal and obtains N first images between a timing of completion of the AF and a timing of the second shutter input signal, in which N is a positive integer greater than 1.

The DSP selects one of the N first images based on at least one of whether the first image is captured at a time close to when the second shutter input signal is received, whether the first image has the largest eyes from among the plurality of first images, whether the first image has eyes similar in size to those of the second image, and whether the first image has eyes in a similar position to that of the second image.

BRIEF DESCRIPTION OF THE DRAWINGS

The above and other features and advantages of the invention will become more apparent by describing in detail exemplary embodiments thereof with reference to the attached drawings in which:

FIGS. 3 and 4 are pictorial diagrams for describing a plurality of a first image and a second image according to another embodiment of the invention;

DETAILED DESCRIPTION

Figure 1:
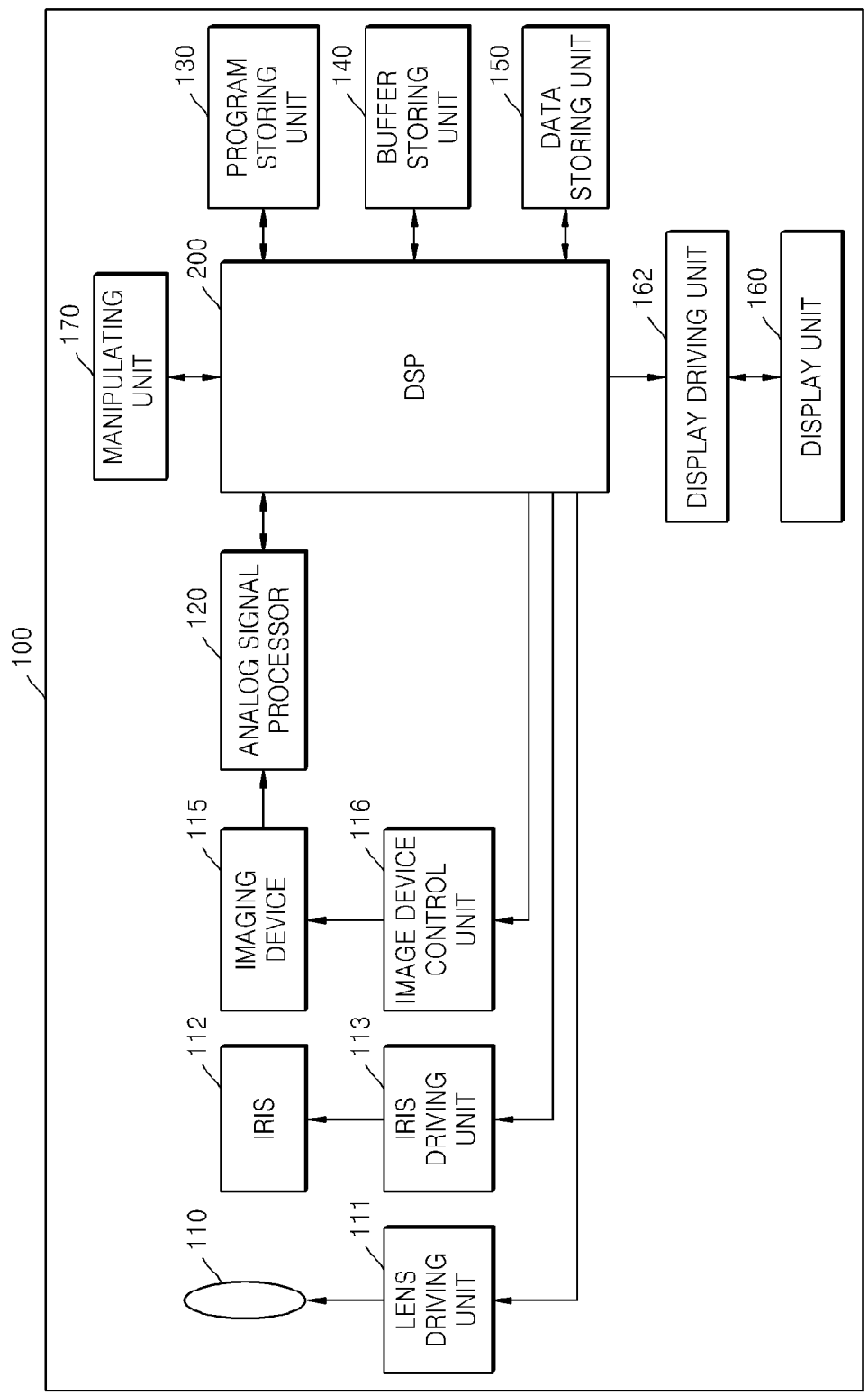
FIG. 1 is a block diagram schematically illustrating a structure of a digital camera as an example of a digital photographing apparatus according to an embodiment of the invention.

Various embodiments of the invention will now be described more fully with reference to the accompanying drawings, in which exemplary embodiments of the invention are shown. The invention may, however, be embodied in many different forms and should not be construed as being limited to the embodiments set forth herein; rather, these embodiments are provided so that this disclosure will be thorough and complete, and will fully convey the concept of the invention to those of ordinary skill in the art. In the drawings, the thicknesses of layers and regions are exaggerated for clarity. (It will also be understood that when a layer is referred to as being "on" another layer or substrate, it can be directly on the other layer or substrate, or intervening layers may also be present.)

Though terms like a first and a second are used to describe various elements, the elements are not limited to these terms. These terms are used only to differentiate an element from another element.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Like reference numerals in the drawings denote like elements, and thus their repetitive description will be omitted.

FIG. 1 is a diagram schematically illustrating the structure of a digital photographing apparatus according to an embodiment of the invention.

A digital camera 100 is described as an example of the digital photographing apparatus according to an embodiment of the invention. However, the digital photographing apparatus is not limited to the digital camera 100 illustrated in FIG. 1, and may also be applied to a digital device, such as a camera phone, a personal digital assistant (PDA), a portable multimedia player (PMP), a smartphone, or the like.

The digital camera 100 according to the present embodiment of the invention may include a lens unit 110, a lens driving unit 111, an iris 112, an iris driving unit 113, an imaging device 115, an imaging device control unit 116, an analog signal processor 120, a program storing unit 130, a buffer storing unit 140, a data storing unit 150, a display driving unit 162, a display unit 160, a digital signal processor (DSP) 200, and a manipulating unit 170. Herein, the lens unit 110, the lens driving unit 111, the iris 112, the iris driving unit 113, the imaging device 115, the imaging device control unit 116, and the analog signal processor 120 may be collectively referred to as a photographing unit.

The lens unit 110 collects a light signal. The lens unit 110 includes a zoom lens for reducing or increasing the angle of view according to a focal length and a focus lens for adjusting the focus on an object, and each of the zoom lens and the focus lens may be a single lens or a group of a plurality of lenses.

The iris 112 regulates the light intensity of an incident light by controlling the amount of opening/closing thereof.

The lens driving unit 111 and the iris driving unit 113 are provided with a control signal from the DSP 200 to drive the lens unit 110 and the iris 112. The lens driving unit 111 controls the position of a lens to adjust a focal length, and performs auto focusing, zooming, focusing operations, and so forth. The iris driving unit 113 controls the amount of opening/closing of the iris 112, and in particular, adjusts an f number or an iris value to perform auto focusing, auto exposure correction, focusing, depth-of-field (DOF) adjusting operations, and the like. The light signal passing through the lens unit 110 forms an image of an object on a light-receiving surface of the imaging device 115. The imaging device 115 may be a charge-coupled device (CCD), a complementary metal-oxide semiconductor image sensor (CIS), or a high-speed image sensor which converts the light signal into an electric signal. The sensitivity of the imaging device 115 may be controlled by the imaging device control unit 116. The imaging device control unit 116 may control the imaging device 115 according to a control signal, which is automatically generated by an image signal input in real time or manually input by the user's manipulation.

The exposure time of the imaging device 115 is controlled by a shutter (not shown). The shutter may be a mechanical shutter for adjusting incidence of light by moving a shade or an electronic shutter for controlling exposure by supplying an electric signal.

The analog signal processor 120 performs noise reduction processing, gain control, wave form standardization, analog-digital conversion, and the like with respect to the analog signal provided from the imaging device 115.

Through the manipulating unit 170, a control signal can be externally input, for example, from a user. The manipulating unit 170 includes a shutter-release button for inputting a shutter-release signal which exposes the imaging device 115 to light for a predetermined time to photograph an object, a power button for inputting a control signal for controlling power-on/off, a wide-angle zoom button and a telephoto zoom button for increasing or reducing the angle of view, respectively, and other function buttons for mode selection from a text input mode, a photographing mode, a play mode, and the like, a white balance setting function, an exposure setting function, and so forth. The manipulating unit 170 may be implemented with, without being limited to, various buttons as described above, but may also be implemented in any form of user input, such as a keyboard, a touch pad, a touch screen, a remote control, or the like.

The digital camera 100 may include the program storing unit 130 for storing programs of an operating system and an application system of digital camera 100, the buffer storing unit 140 for temporarily storing data required during an operation or storing result data, and the data storing unit 150 for storing data required for programs, such as an image file corresponding to an image signal.

The digital camera 100 also includes the display unit 160 for displaying an operational state of the digital camera 100 or image information obtained by the digital camera 100. The display unit 160 may provide visual information and/or audible information to the user. To provide information, the display unit 160 may include, for example, a liquid crystal display (LCD) or an organic light emitting diode (OLED) display. The display driving unit 162 provides a drive signal to the display unit 160.

The digital camera 100 also includes the DSP 200 for processing an input image signal and controlling components of the digital camera 100 according to the input image signal or an externally input signal. The DSP 200 may perform image signal processing for quality improvement, such as noise reduction, gamma correction, color filter array interpolation, color matrix, color correction, and color enhancement, with respect to input image data. The DSP 200 also may compress the image data generated by performing image signal processing for quality improvement to generate an image file, or may restore the image data from the image file. An image compression format may be a lossless format or a lossy format. For example, the suitable format may be a Joint Photographic Experts Group (JPEG) format or a JPEG-2000 format. The compressed data may be stored in the data storing unit 150. The DSP 200 may also functionally perform indistinctness processing, color processing, blur processing, edge emphasis processing, image interpretation processing, image recognition processing, image effect processing, and the like. The image recognition processing may include face recognition and scene recognition. For example, luminance level adjustment, color correction, contrast adjustment, contour emphasis adjustment, screen dividing processing, image generation and synthesis processing, and the like may be performed.

The DSP 200 may execute a program stored in the program storing unit 130 or include a separate module to generate a control signal for controlling auto focusing, zooming, focus changing, and auto exposure correction operations, provide the control signal to the lens driving unit 111, the iris driving unit 113, and the imaging device control unit 116, and collectively control operations of components included in the digital camera 100, such as a shutter, a flash, and the like.

Figure 2A:
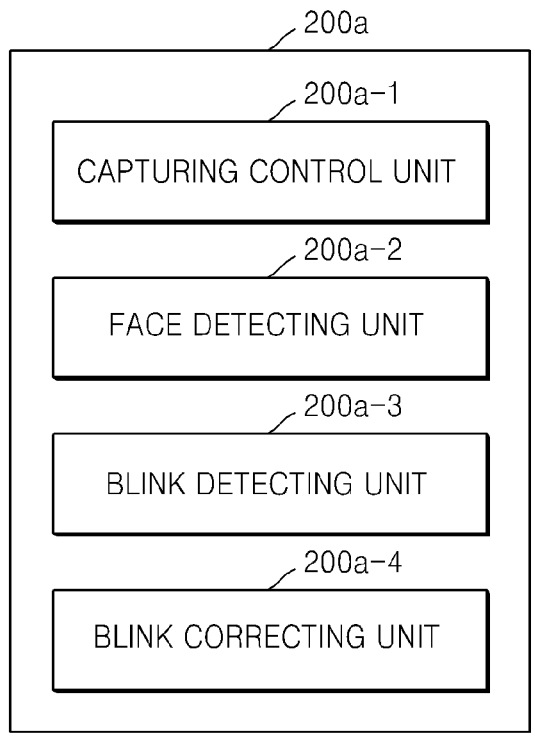
FIG. 2A is a detailed block diagram of a digital signal processor illustrated in FIG. 1, according to an embodiment of the invention.

FIG. 2A is a detailed block diagram of the DSP 200 shown in FIG. 1, according to an embodiment of the invention.

Referring to FIG. 2A, a DSP 200a may include a capturing control unit 200a-1, a face detecting unit 200a-2, a blink detecting unit 200a-3, and a blink correcting unit 200a-4. Herein, it is described that the DSP 200a includes all of the foregoing components, but they may not be separately implemented and instead, may be integrated.

Although it is described below that a face blinking in a main captured image is corrected by using one or more pre-captured images obtained between a first shutter input signal and a second shutter input signal in an embodiment of the invention, the invention is not limited thereto. In other words, it should be understood that the invention can broadly be used to correct any defect or nonconformity of a main captured image captured at a time S2 based on a plurality of images captured after a time S1 to generate an image which conforms to a user's intention at the time S2. For example, a defect caused by motion or hand-shake in an image captured at the time S2 is corrected by using pre-captured images obtained before the time S2, that is, times after the time S1, or an optimal image selected from among the pre-captured images. In the following description, the invention will be described with reference to blink correction as an embodiment.

The DSP 200a obtains a first image from an input image according to a first shutter input signal, obtains a second image from the input image according to a second shutter input signal, and corrects the second image based on the first image. Herein, the first shutter input signal may be a half-shutter signal and the second shutter input signal may be a full-shutter signal.

The DSP 200a performs auto focus (AF) on a preview image according to the first shutter input signal. Herein, AF may be AF processing based on contrast detection, but may be AF processing based on other schemes, for example, pan-focus AF processing or phase difference AF processing. AF based on contrast detection moves a focus lens to an AF region where AF is determined to be performed, that is, a focus lens position at which contrast values of detected face regions are highest. In other words, while the focus lens is moving, a contrast of the imaging device 115, e.g., a CCD, is converted into an electric signal and a waveform of the electric signal is interpreted, such that the focus lens is stopped at the lens position where high-frequency components are largest. A detailed description of AF will not be provided.

After completion of AF, the capturing control unit 200a-1 controls the imaging element control unit 116 to capture an input image at predetermined time intervals. Herein, an exemplary time interval may be, but not limited to, 500 ms. Thus, after the time S1, a plurality of first images are obtained. The obtained first image or plurality of first images is or are stored in a temporary storing unit, for example, the buffer storing unit 140 or the data storing unit 150 shown in FIG. 1. Herein, the single first image may be used as an image for correcting the second image, or when the plurality of second images are stored, an image suitable for correcting each of the second images may be selected. However, a basic precondition for the first image used to correct the second image is that, in this example, the eyes in the first image should not be closed. When there is a plurality of first images, the first image to be used for correcting the second image is selected according to predetermined criteria. For example, the criteria may be whether a corresponding first image is an image captured at a time close to when the second shutter input signal is received, has large eyes, has eyes similar in size to those of the second image, and has eyes in a similar position to that of the second image.

The capturing control unit 200a-1 obtains the first image until input of the second shutter input signal, and controls the imaging element control unit 116 to obtain the second image for the input image upon input of the second shutter input signal.

The face detecting unit 200a-2 detects a face from the captured image. Herein, the captured image includes an image (first image) captured after the input of the half-shutter signal or an image (second image) captured according to the full-shutter signal.

The blink detecting unit 200a-3 detects an eye blink in the first image or the second image. Since a face has eyes, the blink detecting unit 200a-3 may be configured to detect an eye blink only when the face detecting unit 200a-2 detects the face, or may be configured to detect an eye blink in the entire image regardless of face detection.

More specifically, the face detecting unit 200a-2 may detect whether there is a face in the first image or the second image and if so, a position where the face is in the first image or the second image, by using data for detecting the face, stored in the data storing unit 150. The face may be detected using various methods. For example, data about main colors of the face may be previously input, and whether the data about the main colors of the face exists in the image data may be determined, thus detecting the face. Alternatively, data about the pupils or shapes of the eyes of the face may be previously input, and whether the data about the pupils or shapes of the eyes of the face exists in the image data may be determined, thus detecting the face. Data about a T-shape formed by the eyebrows (or eye portions) and a nose may be previously input, and it may be determined whether the data about the T shape exists in the image data, thus detecting the face.

The blink detecting unit 200a-3 may detect an eye blink in various ways, for example, it may determine that eyes are closed if a ratio of a vertical width of each eye to a horizontal length of the eye is smaller than a preset value. The blink detecting unit 200a-3 detects an eye blink in the first image and the second image obtained by the imaging device 115. Herein, there may be a plurality of first images and the first image may be an image stored in a temporary storing unit, such as the buffer storing unit 140 or the data storing unit 150.

The blink correcting unit 200a-4 synthesizes an eye portion of the first image onto the second image if the blink detecting unit 230 determines that there is an eye blink in the second image. Herein, the image synthesis involves cropping an eye portion from each of the first image and the second image and synthesizing the eye portion cropped from the first image onto the second image.

Figure 4:
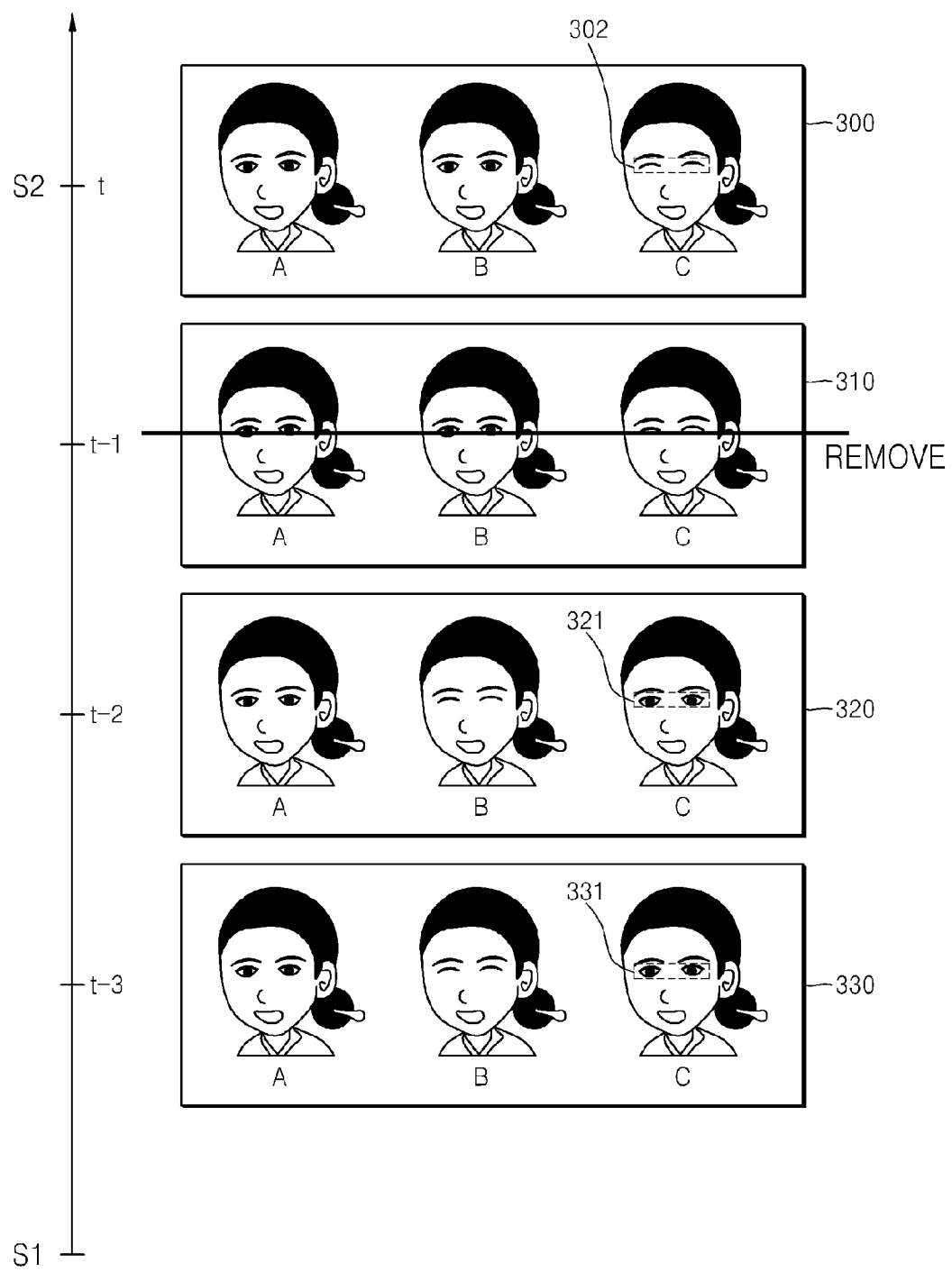

FIGS. 3 and 4 are pictorial diagrams for describing a first image and a second image according to another embodiment of the invention.

Referring to FIG. 3, a left vertical axis indicates S1, (t-3), (t-2), (t-1), and S2 in time units, and images captured at the respective times, i.e., (t-3), (t-2), (t-1), and S2 are shown on the right side. Although three first images 310 through 330 obtained respectively at the times (t-1), (t-2), and (t-3) are shown, the number of first images is not limited to three. In addition, three faces A through C are shown in each obtained image, but the invention can be applied to a one or more faces.

After the time S1, that is, after AF according to the half-shutter input signal, an input image is captured at the time (t-3) to obtain the first image 330, is captured again at the time (t-2) to obtain the first image 320, and is captured again at the time (t-1) to obtain the first image 310. The input image is captured at the time S2, that is, t to obtain a second image 300.

Referring to FIG. 4, it is determined whether the faces A through C in the second image 300 have eyes blinking. When the face C has eyes blinking, as indicated by 301 in FIG. 3, it is determined whether the faces C in the pre-captured first images 310 through 330 have eyes blinking, and the face C in the second image 300 is corrected based on the first images 320 and 330 in which the faces C have no eyes blinking. The first image 310 in which the face C has eyes blinking is removed from the temporary storing unit. An eye portion 302 of the face C of the second image 300 is corrected based on an eye portion 321 of the face C of the first image 320 and an eye portion 331 of the face C of the first image 330. Herein, selection between the first images 320 and 330 for correcting the eye portion 302 of the second image 300 may be made according to criterion described below.

First, a first image which is captured temporally closest to a main captured image, that is, the second image 300, may be selected for correction. Herein, the time (t-1) is closest to the capturing time t of the main captured image, but the first image 310 obtained at the time (t-1) includes the face C that has eyes blinking and thus the eye portion 321 of the face C of the first image 320, obtained at the next closest time (t-2), is used to correct the second image 300. Consequently, focusing on a user's intention of capturing an image at the point in time S2 when the user presses full-shutter button, the image conforming to the user's intention can be reproduced. In other words, the image of a user's desired time can be reflected as much as possible.

Next, a first image may be selected based on the largest eyes, a similar size eyes in a corresponding face, and similar coordinates of a face position or similar face coordinates of a face with those of a face in a main captured image. Although the foregoing criteria have been used in an embodiment of the invention, the first image for correcting the second image may also be selected based on any one of the criteria or some of them in combination. Moreover, criteria other than the above-described criteria may also be used.

The DSP 200 crops an eye portion of a corresponding face of the selected first image, e.g., the eye portion 321 of the face C of the first image 320 obtained at the time (t-2) which is closest to the time S2, and crops the eye portion 302 of the face C of the second image 300. The DSP 200 synthesizes the cropped eye portion 321 of the face C in the first image 320 onto the eye portion 302 of the face C in the second image 300, thus correcting the second image 300. Therefore, the faces A through C of the second image 300 stored and recorded do not have eyes blinking, thereby conforming to the user's intention and improving an image to be stored.

In an embodiment of the invention, since a pre-captured image is obtained between AF and the time S2, the number of pre-captured images may range from 0 to several tens or more, depending on an interval between the user's pressing of the half-shutter button at the time S1 and the full-shutter button between the times S1 and S2 at the time S2. Accordingly, preparation is necessary for a case where the number of pre-captured images is 0 or exceeds a predetermined number, e.g., five. In other words, when the times S1 and S2 are in immediate succession to each other, that is, an interval between the times S1 and S2 is smaller than 500 ms, which is a time interval for capturing the first image, the time for obtaining the first image is insufficient. In this case, a predetermined number of images, e.g., one or two images, may be additionally captured after the time S2. Also in this case, a first image may be selected according to the above-described first image obtaining methods or selection criteria to correct the second image.

Also, the number of pre-captured images, i.e., first images, may exceed a predetermined number, e.g., five, because the user presses the half-shutter button at the time S1 for a long time. Since too many first images may be significantly loaded in view of a system memory and an image may not conform to the user's intention due to an excessively long time interval from a main captured image, the number of first images is limited to the predetermined number to prevent more in number of first images than the predetermined number from being stored.

For example, in case of the limit being set to 5, when $1^{st}$ through $5^{th}$ first images have already been stored in the temporary storing unit, a $6^{th}$ first image is stored after an elapse of a predetermined time, for example, 500 ms, if the user continues pressing the half-shutter button at the time S1. In this case, to store the $6^{th}$ first image, the $1^{st}$ first image is removed and to store a $7^{th}$ first image, the $2^{nd}$ first image is removed. In this case, the stored images may be updated with the most recently captured image.

Figure 5:
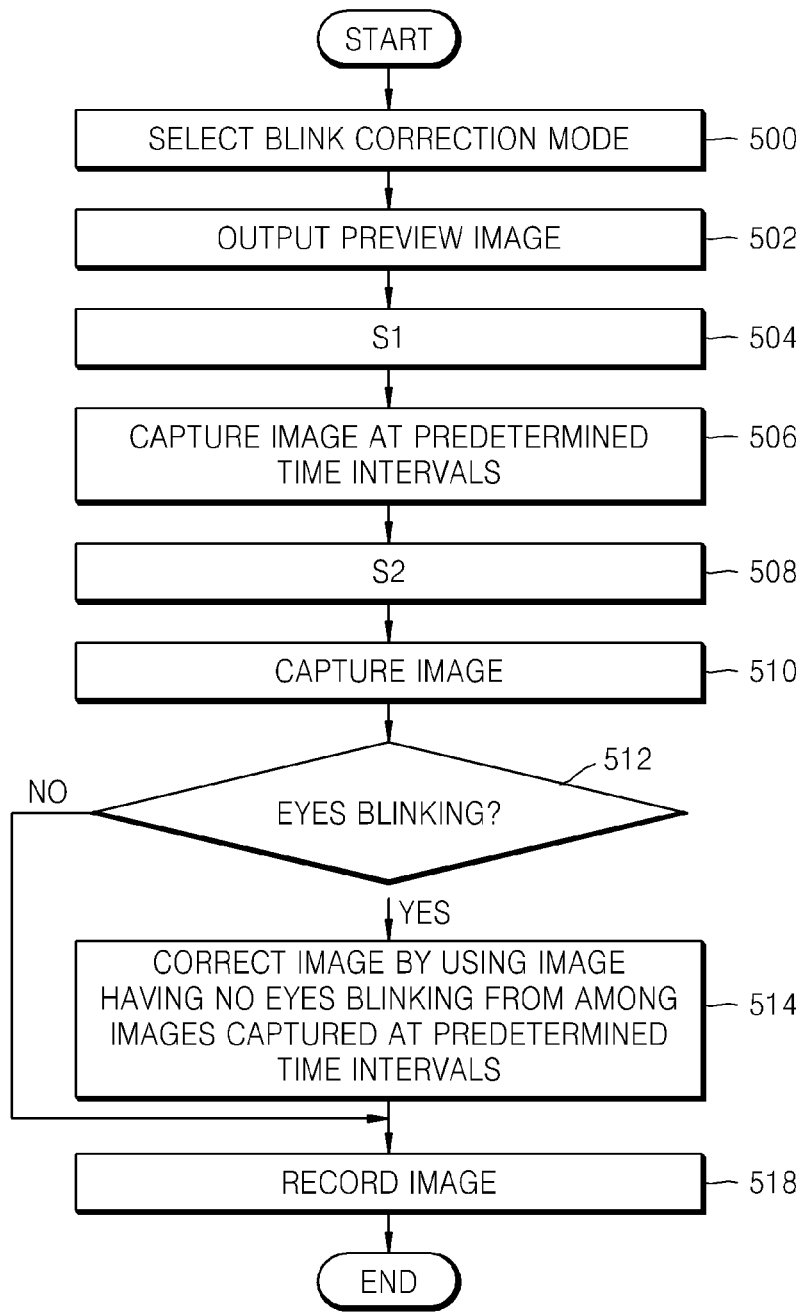
FIG. 5 is a flowchart illustrating a method of controlling a digital photographing apparatus, according to an embodiment of the invention.

FIG. 5 is a flowchart illustrating a method of controlling a digital photographing apparatus, according to an embodiment of the invention.

Referring to FIG. 5, in operation 500, a blink correction mode is selected. In an embodiment of the invention, an image capturing operation is performed at predetermined time intervals between the times S1 and S2 in the blink correction mode, but such a mode selection is not mandatory.

In operation 502, a preview image is output. In operation 504, AF is performed according to the time S1 at which a first shutter input signal is received. In operation 506, an image is captured at predetermined time intervals to obtain one pre-captured image or a plurality of pre-captured images. The one or more obtained pre-captured images are stored in a temporary storage space.

In operations 508 and 510, a main captured image is obtained according to the time S2 at which a second shutter input signal is received.

In operation 512, it is determined whether the main captured image includes eyes blinking. When the main captured image has no closed eyes, the method proceeds to operation 518 to record the main captured image.

If it is determined in operation 512 that the main captured image has eyes blinking, the main captured image obtained in operation 510 is corrected in operation 514 by using an image including eyes that are not blinking from among the pre-captured images obtained in operation 506. In operation 518, the corrected main captured image is recorded.

Figure 6:
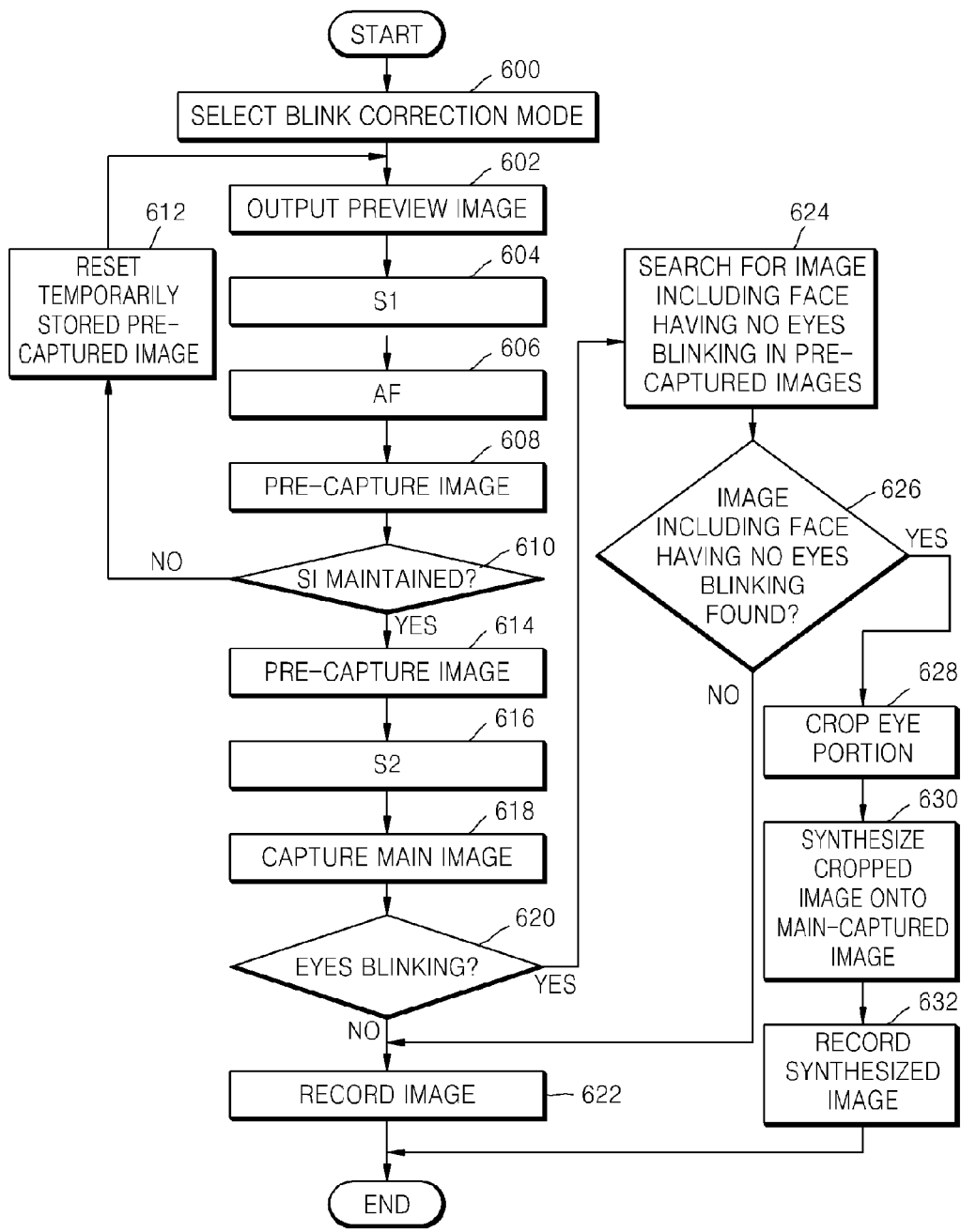
FIG. 6 is a flowchart illustrating a method of controlling a digital photographing apparatus, according to another embodiment of the invention.

FIG. 6 is a flowchart illustrating a method of controlling a digital photographing apparatus, according to another embodiment of the invention.

Referring to FIG. 6, in operation 600, the blink correction mode is selected. The preview image is output on the screen in operation 602, and AF is performed according to the time S1 at which a first shutter input signal is received in operation 606. In operation 608, an image is pre-captured. In operation 610, it is determined whether the time S1 is maintained. If not, a temporarily stored pre-captured image is reset in operation 612 and the method returns to operation 602. If S1 is maintained in operation 610, the image is pre-captured again in operation 614.

In operations 616 and 618, a main image is captured according to the time S2 at which a second shutter input signal is received. In operation 620, it is determined whether the main captured image includes a face having eyes blinking. If so, an image including a corresponding face having no eyes blinking is searched for in the pre-captured images in operation 624. In operation 626, if the image including a face having no eyes blinking is found in the pre-captured images, an eye portion of the face of the found image is cropped in operation 628. The cropped eye portion is synthesized onto the main captured image in operation 630, and the synthesized image is recorded in operation 632.

If there is no face having eyes blinking in the main captured image in operation 620, the method proceeds to operation 622 to record the main captured image.

If the image including a face having no eyes blinking is not found in the pre-captured images in operation 626, the method proceeds to operation 622 to record the main captured image.

Figure 2B:
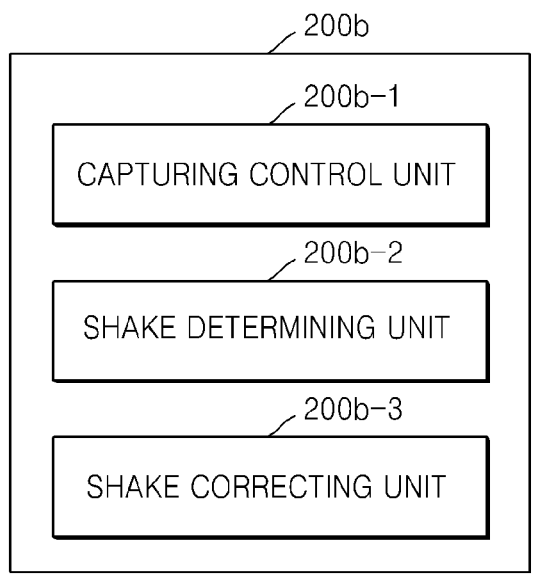
FIG. 2B is a detailed block diagram of a digital signal processor illustrated in FIG. 1, according to another embodiment of the invention.

FIG. 2B is a detailed block diagram of the DSP 200 illustrated in FIG. 1, according to another embodiment of the invention.

Referring to FIG. 2B, a DSP 200b may include a capturing control unit 200b-1, a shake determining unit 200b-2, and a shake correcting unit 200b-3. Herein, it is described that the DSP 200b includes all of the foregoing components, but they may not be separately implemented and instead, may be integrated.

Although it is described that a shake in a main captured image is corrected by using one or more pre-captured images obtained between a first shutter input signal and a second shutter input signal in another embodiment of the invention.

The DSP 200b obtains a first image from an input image according to a first shutter input signal, obtains a second image from the input image according to a second shutter input signal, and corrects the second image based on the first image. Herein, the first shutter input signal may be a half-shutter signal and the second shutter input signal may be a full-shutter signal.

In detail, the DSP 200b performs auto focus (AF) on a preview image according to the first shutter input signal.

After completion of AF, the capturing control unit 200b-1 controls the imaging element control unit 116 to capture an input image at predetermined time intervals. Herein, the time interval may be, but not limited to, 500 ms. Thus, after the time S1, a plurality of first images are obtained. The obtained first image or plurality of first images is or are stored in a temporary storing unit, for example, the buffer storing unit 140 or the data storing unit 150 shown in FIG. 1. Herein, the single first image may be used as an image for correcting the second image, or when the plurality of second images are stored, an image suitable for correcting each of the second images may be selected. However, a basic precondition for the first image used to correct the second image is that there is no shake in the first image but there is a shake in the second image, i.e., in the main captured image captured at the time S2. When there is a plurality of first images, the first image to be used for correcting the second image is selected according to predetermined criteria. For example, the criteria may be whether a corresponding first image is an image with the smallest degree of a shake, an image in which a coordinate in a particular region of a pre-captured image coincides with a coordinate of the main captured image, and an image captured at a time close to when the second shutter input signal is received.

The capturing control unit 200b-1 obtains the first image until input of the second shutter input signal, i.e., S2, and controls the imaging element control unit 116 to obtain the second image for the input image upon input of the second shutter input signal.

The shake determining unit 200b-2 determines whether there is a shake in the pre-captured images obtained between the first shutter input signal and the second shutter input signal and the main captured image according to the second shutter input signal. In an embodiment of the invention, a shake of an image may be determined using various image matching techniques. For example, various image matching techniques include a motion vector, correlation matching, pattern matching, color matching, or the like. The motion vector is a representation of a difference in the amount of movement between the previous screen and the current screen as direction and size, and color matching is performed by measuring a similarity of color distribution. In a color histogram intersection method that is an example of color matching, similarity of color distribution between images is calculated. In pattern matching, a pattern of an image signal in the previous frame is stored, and it is searched for whether the stored pattern is similar to a pattern of an image signal in the current frame. For example, a feature of the previous frame is extracted, and a feature that is similar to the extracted feature is searched for in the previous frame. In an embodiment of the invention, the motion vector, correlation matching, pattern matching, color matching, or the like is used as the image matching technique described above. However, the invention is not limited thereto, and it is obvious to one of ordinary skill in the art that other image matching techniques may be used. In particular, it is sufficient to check whether the previous image frame is compared with the last image frame and is the same as the last image frame or not.

The shake determining unit 200b-2 firstly determines whether there is a shake in the main captured image. When there is no shake in the main captured image, there is no need to determine whether there is a shake in the pre-captured image, and only when there is a shake in the main captured image, it is determined whether there is a shake in one or more pre-captured images. Also, when there are a plurality of pre-captured images, a pre-captured image with the smallest degree of a shake is selected.

The shake correcting unit 200b-3 replaces the optimum pre-captured image that is selected by the shake determining unit 200b-2 by the main captured image when there is a shake in the main captured image.

Figure 7:
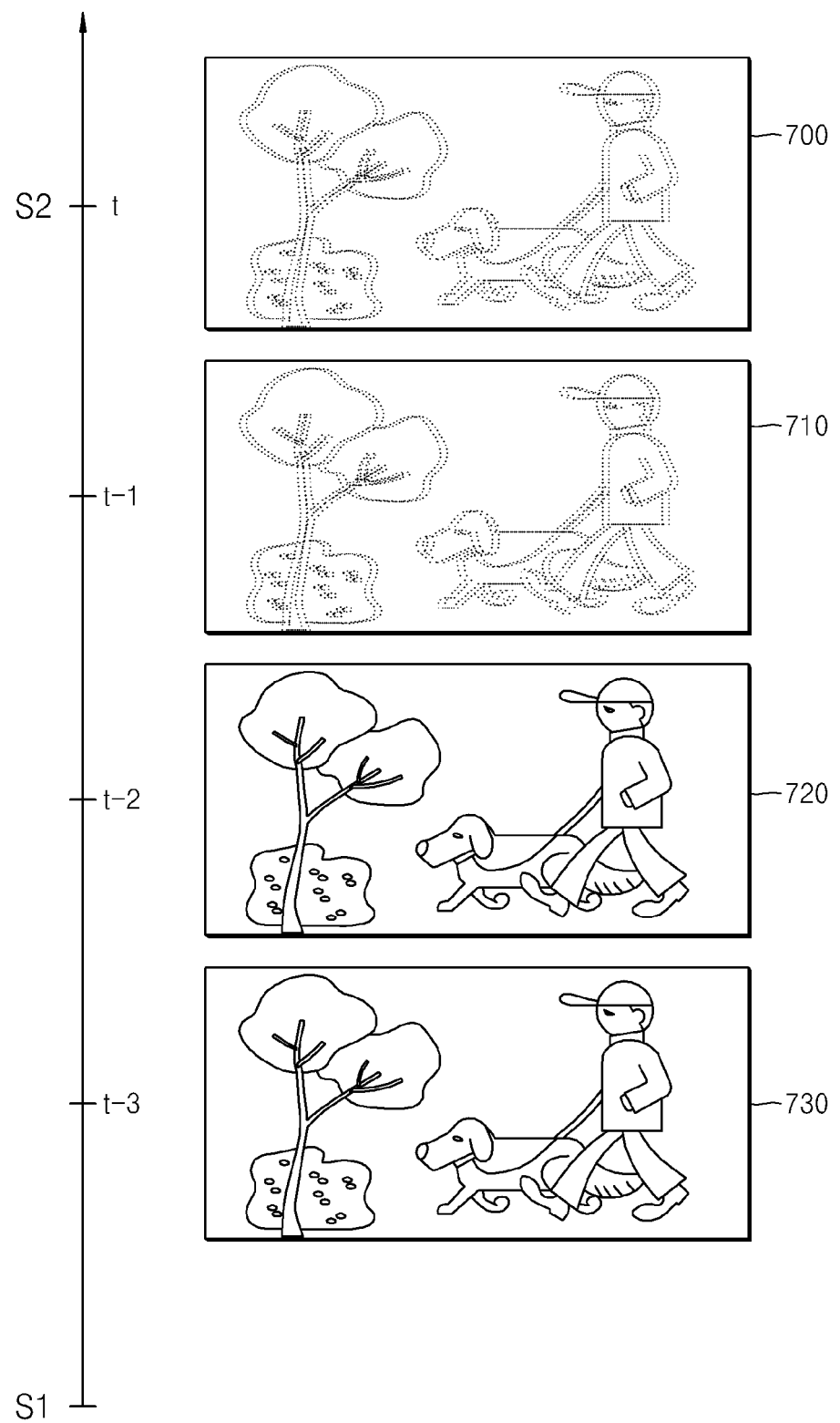
FIGS. 7 and 8 are pictorial diagrams for describing a plurality of a first image and a second image according to another embodiment of the invention.
Figure 8:
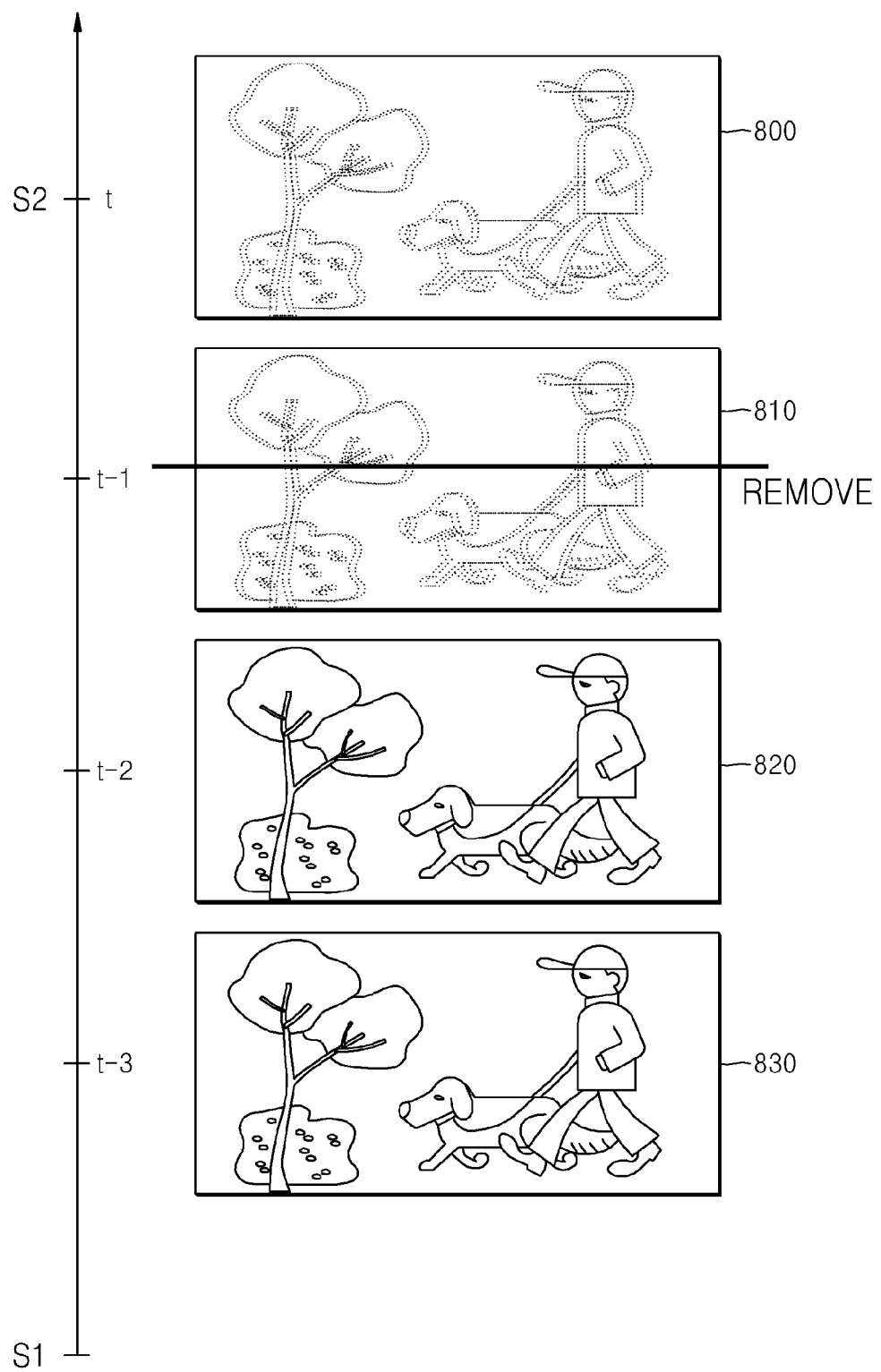

FIGS. 7 and 8 are diagrams for describing a first image and a second image according to another embodiment of the invention.

Referring to FIG. 7, a left vertical axis indicates S1, (t-3), (t-2), (t-1), and S2 in time units, and images captured at the respective times, i.e., (t-3), (t-2), (t-1), and S2 are shown on the right side. Although three first images 710 through 730 obtained respectively at the times (t-3), (t-2), and (t-1) are shown, the number of first images is not limited to three.

After the time S1, that is, after AF according to the half-shutter input signal, an input image is captured at the time (t-3) to obtain the first image 330, is captured again at the time (t-2) to obtain the first image 720, and is captured again at the time (t-1) to obtain the first image 710.

The input image is captured at the time S2, that is, t to obtain a second image 700.

Referring to FIG. 8, it is determined whether there is a shake in a second image 800. When there is a shake in the second image 800, it is determined whether there is a shake in pre-captured and temporarily stored images 810 through 830. The image 810 with a shake from among the temporarily-stored images 810 through 830 is removed from the temporary storing unit. One is selected from the first images 820 and 830. Herein, selection between the first images 820 and 830 may be made according to criterion described below.

First, an image with the smallest degree of a shake, an image in a particular region of the main captured image, for example, an image in which a coordinate of a face of a person coincides with a coordinate of a face in the first images 820 and 830, or an image with a short capturing distance with the main captured image 800, here, the first image 820 may be selected from the first images 820 and 830. Consequently, focusing on a user's intention of capturing an image at the point in time S2 when the user presses full-shutter button, the image conforming to the user's intention can be reproduced. In other words, the image of a user's desired time can be reflected as much as possible.

The shake correcting unit 200b-3 replaces the selected first image 820 by a main image. The DSP 200b stores and records the selected first image 820 as the main image. Thus, there is no shake in the stored and recorded first image 820, and the quality of an image to be stored may be improved in conformity with the user's intention.

In an embodiment of the invention, since a pre-captured image is obtained between AF and the time S2, the number of pre-captured images may range from 0 to several tens or more, depending on an interval between the user's pressing of the half-shutter button at the time S1 and the full-shutter button between the times S1 and S2 at the time S2. Accordingly, preparation is necessary for a case where the number of pre-captured images is 0 or exceeds a predetermined number, e.g., five. In other words, when the times S1 and S2 are in immediate succession to each other, that is, an interval between the times S1 and S2 is smaller than 500 ms which is a time interval for capturing the first image, the time for obtaining the first image is insufficient. In this case, a predetermined number of images, e.g., one or two images may be additionally captured after the time S2. Also in this case, a first image may be selected according to the above-described first image obtaining methods or selection criteria to correct the second image.

Also, the number of pre-captured images, i.e., first images, may exceed a predetermined number, e.g., five, because the user presses the half-shutter button at the time S1 for a long time. Since too many first images may be significantly loaded in view of a system memory and an image may not conform to the user's intention due to an excessively long time interval from a main captured image, the number of first images is limited to the predetermined number to prevent first images more in number than the predetermined number from being stored.

For example, in case of the limit being set to 5, when $1^{st}$ through $5^{th}$ first images have already been stored in the temporary storing unit, a $6^{th}$ first image is to be stored after an elapse of a predetermined time, for example, 500 ms if the user continues pressing the half-shutter button at the time S1. In this case, to store the $6^{th}$ first image, the $1^{st}$ first image is removed and to store a $7^{th}$ first image, the $2^{nd}$ first image is removed. In this case, the stored images may be updated with the most recently captured image.

Figure 9:
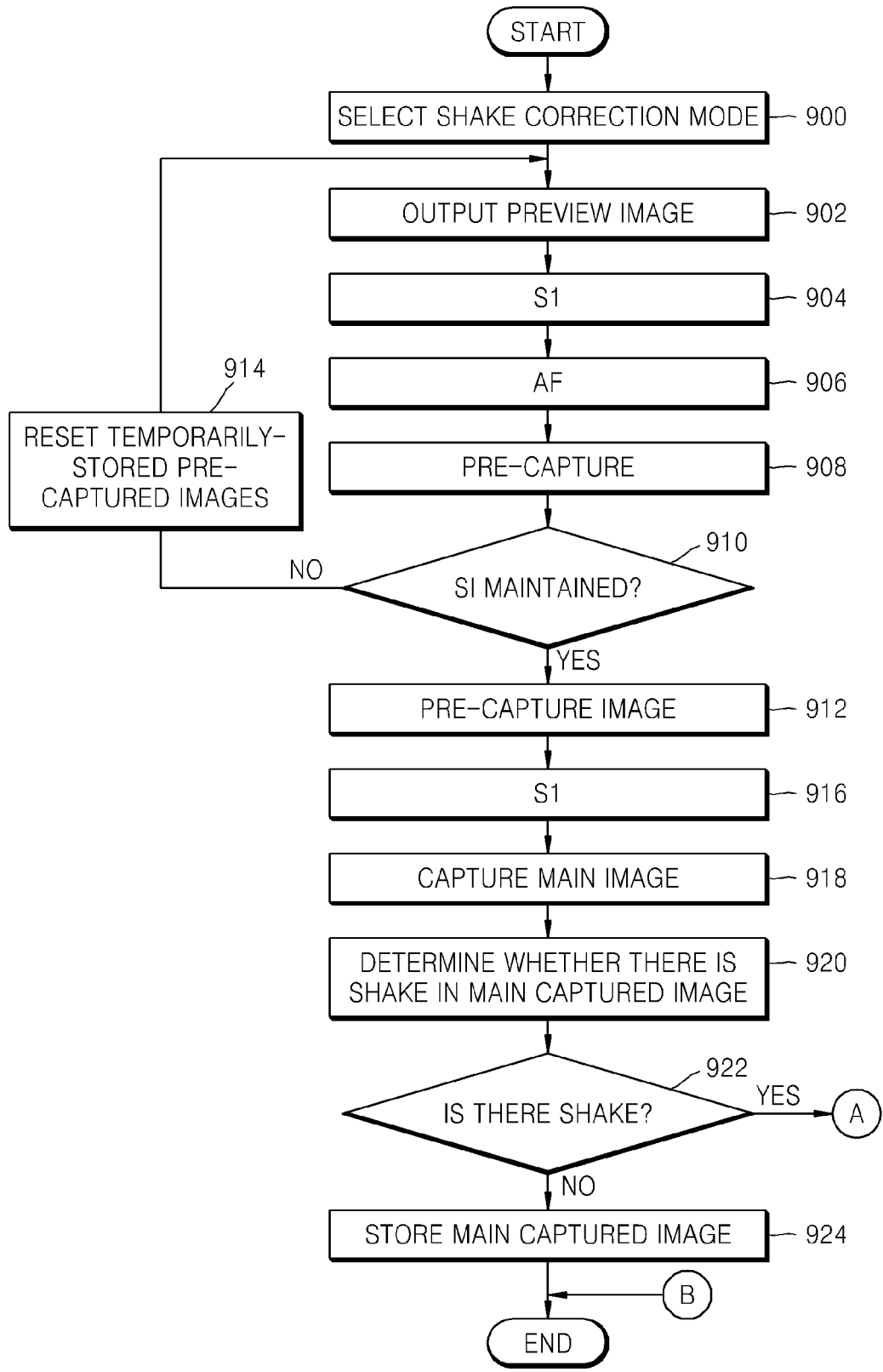
FIGS. 9 and 10 are flowcharts illustrating a method of controlling a digital photographing apparatus, according to another embodiment of the invention.
Figure 10:
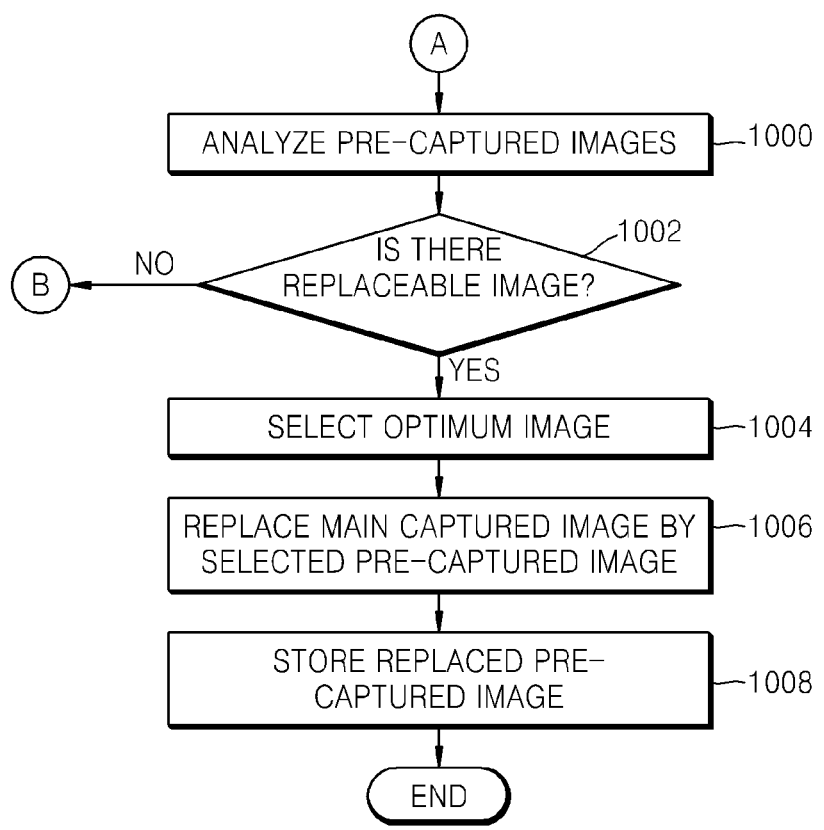

FIGS. 9 and 10 are flowcharts illustrating a method of controlling a digital photographing apparatus, according to another embodiment of the invention.

Referring to FIG. 9, in operation 900, a shake correction mode is selected. In an embodiment of the invention, an image capturing operation is performed at predetermined time intervals between the times S1 and S2 in the shake correction mode, but such a mode selection is not mandatory.

In operation 902, a preview image is output. In operations 904 and 906, AF is performed according to the time S1 at which a first shutter input signal is received.

In operation 908, an image is captured at predetermined time intervals to obtain one pre-captured image or a plurality of pre-captured images. The one or more obtained pre-captured images are stored in a temporary storage space. In operation 910, it is determined whether the state of the time S1 is maintained. When it is determined in operation 910 that the state of the time S1 is not maintained, i.e., when the user stops performing an image capturing operation, the method proceeds to operation 914 to reset the one or more temporarily-stored pre-captured images. When it is determined in operation 910 that the state of the time S1 is maintained, in operation 912, the one or more pre-captured images are continuously obtained at predetermined time intervals.

In operations 912 and 916, a main image capturing operation is performed according to the time S2.

In operation 920, it is determined whether there is a shake in the main captured image. If it is determined in operation 920 that there is no shake in the main captured image, in operation 924, the main captured image is stored, and the method is terminated.

If it is determined in operation 920 that there is a shake in the main captured image, the method proceeds to operation A.

Referring to FIG. 10, after operation A, in operation 1000, the one or more pre-captured images obtained in operations 908 and 912 of FIG. 9 are analyzed. In operation 1002, it is determined whether there is a pre-captured image that may be replaced with the main captured image. That is, when there is no shake in the pre-captured images, the method proceeds to operation 1004, and when there is a shake in the pre-captured images, the method proceeds to operation 924.

In operation 1002, when it is determined in operation 1002 that there is a pre-captured image that may be replaced with the main captured image, in operation 1004, an optimum image is selected from a plurality of pre-captured images, and in operation 1006, the main captured image is replaced by the pre-captured image selected in operation 1004. In operation 1008, the replaced pre-captured image is stored, and the method is terminated.

According to an embodiment of the invention, a blink portion or a shake in the main captured image can be corrected based on one or more pre-captured images obtained after the time S1, so that a photographer's intention can be reflected to the maximum and the quality of an image that may be severely damaged due to a facial expression change or a shake can be improved.

Moreover, even when there are a plurality of pre-captured images after the time S1, a memory can be managed in conformity with a user's intention.

The digital photographing apparatus according to the invention may include a processor, a memory for storing and executing program data, a permanent storage such as a disk drive, a communication port for communicating with an external device, and a user interface unit, such as a touch panel, a key, or a button. Methods implemented with a software module or algorithm may be stored as computer-readable codes or program commands, which can be executed on the processor, on a computer-readable recording medium, etc. Examples of the computer-readable recording medium may include magnetic storage media such as read-only memory (ROM), random access memory (RAM), floppy disks, and hard disks, and optical data storage devices such as CD-ROMs and digital versatile discs (DVD). The computer-readable recording medium can also be distributed over a network of coupled computer systems so that the computer-readable code is stored and executed in a decentralized fashion. The code can be read by the computer, stored in the memory, and executed on the processor.

All documents cited in the invention, including published documents, patent applications, and patents, may be incorporated herein in the same manner as when each cited document is separately and specifically incorporated or incorporated in its entirety.

For the purposes of promoting an understanding of the principles of the invention, reference has been made to the embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

The invention may be described in terms of functional block components and various processing steps. Such functional blocks may be realized by any number of hardware and/or software components configured to perform the specified functions. For example, the invention may employ various integrated circuit components, e.g., memory elements, processing elements, logic elements, look-up tables, and the like, which may carry out a variety of functions under the control of one or more microprocessors or other control devices. Similarly, where the elements of the invention are implemented using software programming or software elements the invention may be implemented with any programming or scripting language such as C, C++, Java, assembler, or the like, with the various algorithms being implemented with any combination of data structures, objects, processes, routines or other programming elements. Functional embodiments may be implemented with an algorithm executed in one or more processors. Furthermore, the invention could employ conventional techniques for electronics configuration, signal processing and/or control, data processing and the like.

The particular implementations shown and described herein are illustrative examples of the invention and are not intended to otherwise limit the scope of the invention in any way. For the sake of brevity, conventional electronics, control systems, software development and other functional embodiments of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical".

In the specification (particularly in the claims) of the invention, the use of the term "the" and its similar indicative terms may correspond to both singular and plural. When a range is stated in the invention, it covers the invention where an individual value included in that range is applied (unless stated otherwise), and such statement is equivalent to statement of each individual value forming the range in the detailed description of the invention. Unless the order of steps forming the method according to the invention are explicitly stated or stated otherwise, those steps may be performed in any appropriate order. The stated order of the steps does not necessarily limit the invention. In the invention, the use of any example or exemplary term (for example, "and so forth") is merely intended to describe the invention in detail, and thus unless defined by the claims, the scope of the invention is not limited by the example or exemplary term. In addition, it can be understood by those of ordinary skill in the art that various modifications, combinations, and changes can be made according to design conditions and factors within the scope of claims and equivalents thereof.

What is claimed is:

1. A method of controlling a digital photographing apparatus, comprising:
    selecting a first image from a plurality of pre-captured images of an input image according to a first shutter input signal;
    capturing a second image of the input image according to a second shutter input signal; and
    correcting the second image based on the first image by synthesizing a portion of the first image onto the second image or replacing the second image with the first image,
    wherein the plurality of pre-captured images are generated between a first time corresponding to a completion of auto focusing on the input image according to the first shutter input signal and a second time corresponding to when the second shutter input signal is received.

2. The method of claim 1, wherein the first shutter input signal is a half-shutter signal and the second shutter input signal is a full-shutter signal.

3. The method of claim 1, further comprising:
    detecting a face from the second image;
    detecting an eye blink from the detected face; and
    if the eye blink is detected, synthesizing an eye portion in the first image onto the second image.

4. The method of claim 1, further comprising determining whether there is a shake in the second image, wherein the correcting of the second image comprises, if there is a shake in the second image, replacing the second image by the first image.

5. The method of claim 4, further comprising storing the N first images.

6. The method of claim 5, wherein when a $(N+1)^{th}$ first image is to be stored, one of the stored first images is removed in an order they are stored.

7. The method of claim 1, wherein generating the plurality of pre-captured images comprises:
    performing auto focusing on the input image according to the first shutter input signal; and
    capturing N images at predetermined time intervals between the first time corresponding to the completion of the AF and the second time corresponding to when the second shutter input signal is received, and
    wherein N is a positive integer greater than 1.

8. The method of claim 7, wherein capturing the N images comprises:
    detecting a face from each of the N images;
    excluding one of the N images comprising a face having eyes blinking; and
    selecting one of the remaining N images having no eyes blinking.

9. The method of claim 8, wherein the correcting of the second image comprises:
    cropping an eye portion of the selected first image and an eye portion of the second image; and
    synthesizing the cropped eye portion of the first image onto the eye portion of the second image.

10. The method of claim 8, wherein the selecting of the first image comprises selecting a first image captured at a time closest to when the second shutter input signal is received.

11. The method of claim 8, wherein the selecting of the first image comprises selecting a first image having largest eyes from among the first images having no eyes blinking.

12. The method of claim 8, wherein the selecting of the first image comprises:
    comparing a size of the eyes of each of the first images comprising faces having no eyes blinking with a size of the eyes of the second image; and
    selecting a first image which has eyes most similar in size to those of the second image.

13. The method of claim 8, wherein the selecting of the first image comprises:
    comparing a position of the eyes a face of each of the first images comprising faces having no eyes blinking with a position of the eyes of a face of the second image; and
    selecting a first image which has eyes in a most similar position to that of the second image.

14. The method of claim 7, wherein capturing the N images comprises:
    determining whether there is a shake in the N images;
    excluding a first image with a shake from the N images; and
    selecting one of the remaining images having no shake.

15. The method of claim 14, wherein the selecting of the first image comprises selecting the first image based on:
    an image with the smallest degree of a shake,
    an image in which a coordinate in a particular region of the second image coincides with a coordinate of the first image, and
    an image captured at a time close to when the second shutter input signal is received.

16. A method of controlling a digital photographing apparatus, the method comprising:
    performing auto focusing on an input image according to a half-shutter input signal;
    capturing a plurality of images by capturing the input image at predetermined time intervals after completion of the auto focusing, and storing the captured plurality of images;
    selecting a first image from the plurality of images;
    obtaining a second image by capturing the input image according to a full-shutter input signal;
    detecting an eye blink from the second image and if the eye blink is detected,
    wherein selecting the first image comprises selecting an image having no eye blink from among the plurality of images; and cropping an eye portion of the selected first image and an eye portion of the second image and synthesizing the cropped eye portion of the first image onto the second image.

17. The method of claim 16, further comprising removing the stored plurality of first images if the eye blink is not detected from the second image.

18. The method of claim 16, wherein the selecting of the first image comprises selecting the first image based on at least one of whether the first image is captured at a time close to when the full-shutter input signal is received, whether the first image has the largest eyes from among the plurality of first images, whether the first image has eyes similar in size to those of the second image, and whether the first image has eyes in a similar position to that of the second image.

19. A digital photographing apparatus comprising:
a digital signal processor (DSP) that performs the following operations:
selecting a first image from pre-captured images of an input image according to a first shutter input signal,
capturing a second image of the input image according to a second shutter input signal, and
correcting the second image based on the first image by synthesizing a portion of the first image onto the second image or replacing the second image with the first image,
wherein the plurality of pre-captured images are generated between a first time corresponding to a completion of auto focusing on the input image according to the first shutter input signal and a second time corresponding to when the second shutter input signal is received.

20. The digital photographing apparatus of claim 19, wherein the first shutter input signal is a half-shutter signal and the second shutter input signal is a full-shutter signal.

21. The digital photographing apparatus of claim 19, wherein the DSP comprises:
a face detecting unit that detects a face from the second image;
a blink detecting unit that detects an eye blink from the detected face; and
a blink correcting unit that synthesizes an eye portion in the first image onto an eye portion of the second image if the eye blink is detected.

22. The digital photographing apparatus of claim 21, wherein the DSP selects one of the N first images based on at least one of whether: a) the first image is captured at a time close to when the second shutter input signal is received, b) whether the first image has the largest eyes from among the plurality of first images, c) whether the first image has eyes similar in size to those of the second image, and d) whether the first image has eyes in a similar position to that of the second image.

23. The digital photographing apparatus of claim 19, wherein the DSP comprises:
a shake determining unit that determines whether there is a shake in the second image
and when there is a shake in the second image, determines whether there is a shake in
at least one first image; and
a shake correcting unit that, when there is a shake in the second image, selects a first image having no shake and replaces the second image by the selected first image.

24. The digital photographing apparatus of claim 19, wherein the DSP performs auto focusing on the input image according to the first shutter input signal and captures N images between a timing of completion of the AF and when the second shutter input signal is received, wherein N is a positive integer greater than 1.

* * * * *